(12) United States Patent
Doi et al.

(10) Patent No.: US 10,010,960 B2
(45) Date of Patent: Jul. 3, 2018

(54) WELDING SYSTEM AND COMMUNICATION METHOD FOR WELDING SYSTEM

(71) Applicant: DAIHEN Corporation, Osaka-shi, Osaka (JP)

(72) Inventors: Toshimitsu Doi, Osaka (JP); Futoshi Nishisaka, Osaka (JP)

(73) Assignee: DAIHEN Corporation, Osaka (JP)

( * ) Notice: Subject to any disclaimer, the term of this patent is extended or adjusted under 35 U.S.C. 154(b) by 278 days.

(21) Appl. No.: 14/730,331

(22) Filed: Jun. 4, 2015

(65) Prior Publication Data
US 2015/0375330 A1 Dec. 31, 2015

(30) Foreign Application Priority Data

Jun. 25, 2014 (JP) ................................ 2014-130385

(51) Int. Cl.
*H05B 7/11* (2006.01)
*B23K 9/10* (2006.01)
(Continued)

(52) U.S. Cl.
CPC ............ *B23K 9/1006* (2013.01); *B23K 9/095* (2013.01); *B23K 9/0953* (2013.01); *B23K 9/10* (2013.01); *B23K 9/1087* (2013.01); *B23K 9/32* (2013.01)

(58) Field of Classification Search
CPC ........ B23K 9/1006; B23K 9/095; B23K 9/32; B23K 9/1087; B23K 9/0953
(Continued)

(56) References Cited

U.S. PATENT DOCUMENTS 5,410,126 A * 4/1995 Miller ................. B23K 9/1043
219/130.1
2002/0168937 A1* 11/2002 Clark ................... B23K 9/1062
455/41.1
(Continued)

FOREIGN PATENT DOCUMENTS

| JP | 61-222682 A | 10/1986 |
| JP | 2005-279740 A | 10/2005 |
| JP | 4739621 B2 | 5/2011 |

OTHER PUBLICATIONS

European Search Report issued in corresponding European Patent Application, dated Dec. 2, 2015 (3 pages).
(Continued)

*Primary Examiner* — Thien S Tran
(74) *Attorney, Agent, or Firm* — Hamre, Schumann, Mueller & Larson, P.C.

(57) ABSTRACT

A welding system performs communication accurately without provision of a control line between a welding power supply device and a wire feeding device. The welding system includes a welding power supply device, a wire feeding device, a welding torch, and power cables for supplying welding power from the welding power supply device to the welding torch. The system also includes power transfer lines for supplying power for driving a feeding motor disposed in the wire feeding device, so that the welding power supply device and the wire feeding device perform communication via the power transfer lines. The power transfer lines have less superimposed noise compared to the power cables. Accordingly, communication can be performed more accurately than in the case of performing communication via the power cables.

10 Claims, 8 Drawing Sheets

(51) Int. Cl.
   *B23K 9/095*     (2006.01)
   *B23K 9/32*      (2006.01)
(58) Field of Classification Search
   USPC ............ 219/108, 130.1, 130.5, 132, 137.63,
                                                 219/137.71
   See application file for complete search history.

(56) References Cited

U.S. PATENT DOCUMENTS

| | | | |
|---|---|---|---|
| 2008/0011730 A1* | 1/2008 | Enyedy .................. | B23K 9/323 |
| | | | 219/137.9 |
| 2010/0314369 A1 | 12/2010 | Kaufman | |
| 2011/0049116 A1* | 3/2011 | Rappl .................. | B23K 9/1006 |
| | | | 219/132 |
| 2011/0073569 A1* | 3/2011 | Rappl .................... | B23K 9/095 |
| | | | 219/73.2 |
| 2011/0240620 A1 | 10/2011 | Ott et al. | |
| 2011/0247999 A1* | 10/2011 | Ihde ....................... | B23K 9/323 |
| | | | 219/74 |

OTHER PUBLICATIONS

Office Action issued in the corresponding Japanese Patent application, dated Feb. 27, 2018 (5 pages).

\* cited by examiner

WELDING SYSTEM AND COMMUNICATION METHOD FOR WELDING SYSTEM

BACKGROUND OF THE INVENTION

1. Field of the Invention

The present invention relates to a welding system and a communication method for a welding system.

2. Description of Related Art

A consumable-electrode welding system is normally divided into a welding power supply device that is not moved since it has weight, and a wire feeding device that a welding technician carries accompanying a change in a welding location. If the welding power supply device is installed at a location away from the position at which welding work is being performed, it is not productive for the worker to go to the installation position of the welding power supply device to set a welding condition such as the welding voltage. In order to resolve this problem, a method exists in which control signals are transmitted and received by connecting the welding power supply device and the wire feeding device using a multicore cable of a control line. However, when the wire feeding device is moved due to a change in welding location, since the multicore cable has low portability, there have been times when forcibly pulling it has resulted in the control line being cut due to being caught on metal edge portions or protrusions/recession depending on the work environment of the site.

In order to resolve this problem, a method has been developed in which communication is performed by superimposing control signals on a power cable for the welding power supply device to supply power for welding to a welding torch (e.g., see JP-B-4739621).

However, in the case of the method of performing communication by superimposing the control signal on the power cable, there are cases where the control signal cannot be accurately communicated due to the influence of noise superimposed on the power cable, and the like.

SUMMARY OF THE INVENTION

The present invention has been proposed under the foregoing circumstances, and it is an object thereof to provide a welding system according to which communication can be performed as accurately as possible without provision of a control line between a welding power supply device and a wire feeding device.

According to a first aspect of the present invention, there is provided a welding system provided with: a welding power supply device; a peripheral device; a welding torch; a power cable for supplying welding power from the welding power supply device to the welding torch; and a power transfer line for supplying power for driving the peripheral device from the welding power supply device to the peripheral device. The welding power supply device and the peripheral device are configured to perform communication via the power transfer line.

In an embodiment, the peripheral device is a wire feeding device.

In an embodiment, the welding system is further provided with a remote operation device that is connected by a cable to the wire feeding device and removably attached to the wire feeding device. Information inputted by operating an operating means of the remote operation device is transmitted to the welding power supply device via the wire feeding device and the power transfer line.

In an embodiment, the wire feeding device and the remote operation device transmit and receive a digital signal.

In an embodiment, the welding system is further provided with a voltage signal line for transmitting a welding voltage (which is a voltage between a vicinity of a leading end of the welding torch and a workpiece) as a voltage signal to the welding power supply device, and the welding power supply device includes a voltage detecting means for detecting the welding voltage based on the voltage signal transmitted using the voltage signal line.

In an embodiment, the welding system is further provided with a gas pipe for supplying a shielding gas to the welding torch, and at least a part of the power transfer line is arranged inside of the gas pipe.

In an embodiment, the gas pipe extends via the welding power supply device and the wire feeding device.

In an embodiment, the power supplied by the welding power supply device to the peripheral device is DC power.

In an embodiment, the power transfer line is a cable with two parallel lines.

According to a second aspect of the present invention, there is provided a communication method for a welding system that includes a welding power supply device, a peripheral device, a welding torch, a power cable for supplying welding power from the welding power supply device to the welding torch, and a power transfer line for supplying power for driving the peripheral device from the welding power supply device to the peripheral device. The communication method includes: a first step in which one of the welding power supply device and the peripheral device superimposes a communication signal on the power transfer line; and a second step in which the other of the welding power supply device and the peripheral device detects the communication signal superimposed on the power transfer line.

In an embodiment, the power transfer line is a cable with two parallel lines.

In an embodiment, the communication system is further provided with a gas pipe for supplying a shielding gas to the welding torch, and at least a part of the power transfer line is arranged inside of the gas pipe.

In an embodiment, the peripheral device is a wire feeding device.

In an embodiment, the welding power supply device is provided with a first power supply unit for converting single-phase AC power into DC power, and the wire feeding device is provided with a wire feeding motor and a second power supply unit for converting the DC power into a voltage appropriate for the wire feeding motor. The power transfer line connects the first power supply unit and the second power supply unit to each other.

In an embodiment, each of the first step and the second step is performed using a direct sequence spread spectrum communication method.

According to the present invention, communication is performed between the welding power supply device and a peripheral device via a power transfer line that has less superimposed noise compared to a power cable. Accordingly, communication can be performed more accurately than in the case of performing communication via the power cable.

Other features and advantages of the present invention will become apparent from the detailed description given below with reference to the accompanying drawings.

DESCRIPTION OF THE PREFERRED EMBODIMENTS

Hereinafter, embodiments of the present invention will be described in detail with reference to the drawings.

Figure 1:
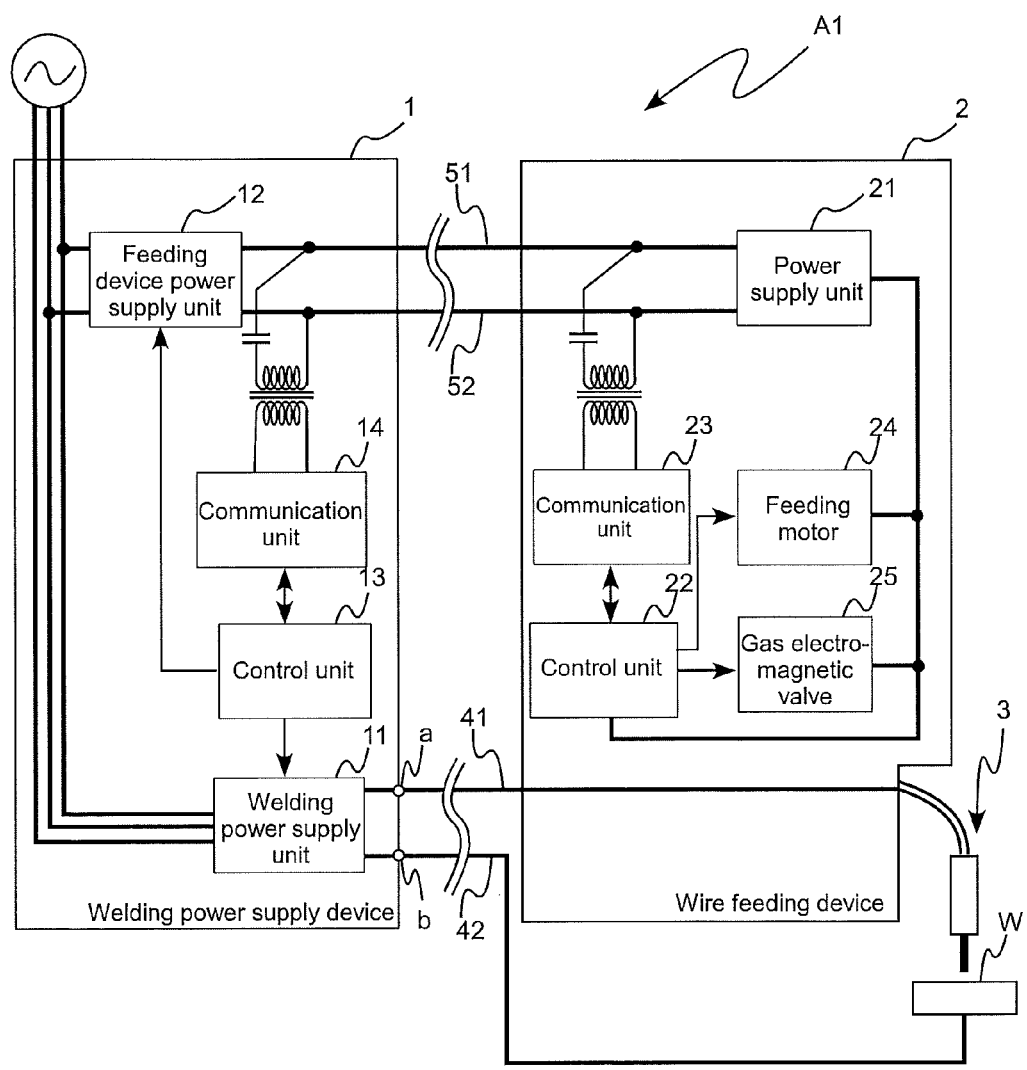
FIG. 1 is a diagram for illustrating an overall configuration of a welding system according to a first embodiment.
Figure 2:
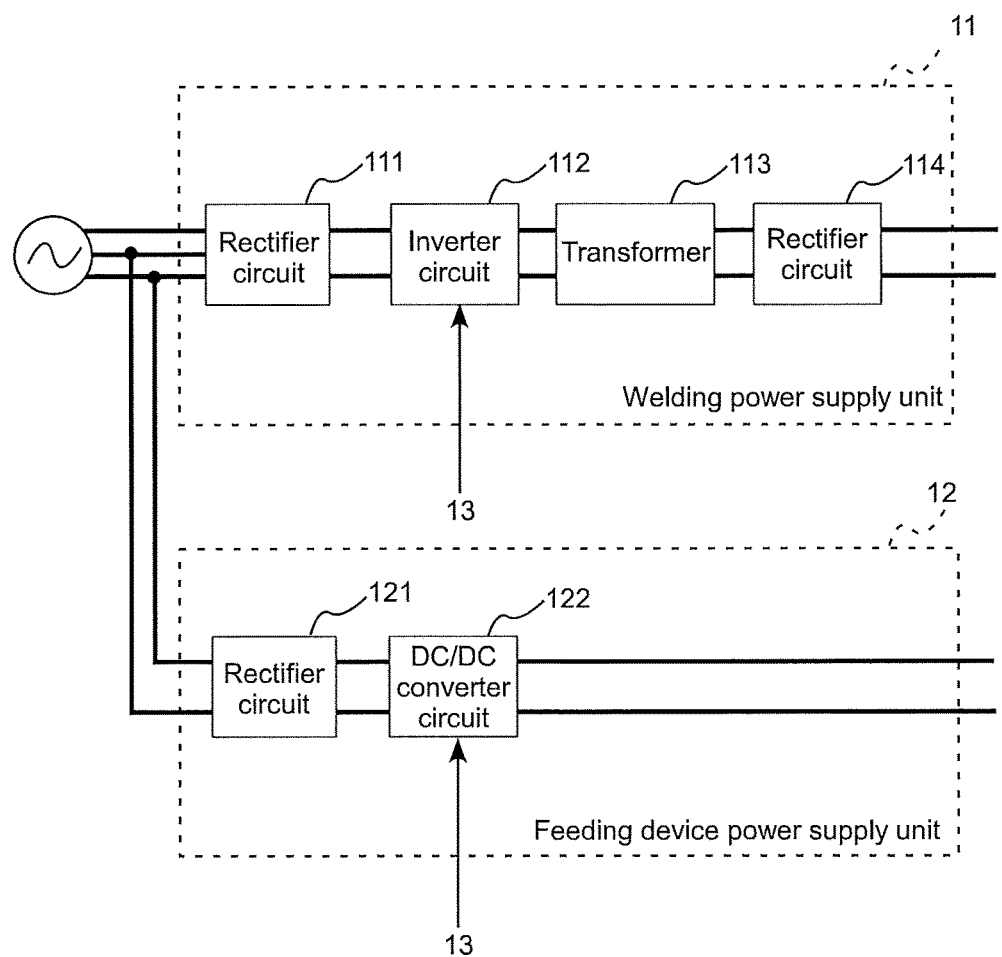
FIG. 2 shows an example of an internal configuration of a welding power supply unit and a feeding device power supply unit.

FIG. 1 is a diagram for illustrating an overall configuration of a welding system A1 according to a first embodiment, and FIG. 2 shows an example of an internal configuration of a welding power supply unit 11 and a feeding device power supply unit 12.

The welding system A1 includes a welding power supply device 1, a wire feeding device 2, a welding torch 3, power cables 41 and 42, and power transfer lines 51 and 52. One output terminal a for welding power from the welding power supply device 1 is connected to the wire feeding device 2 via the power cable 41. The wire feeding device 2 feeds a wire electrode to the welding torch 3, and the leading end of the wire electrode protrudes from the leading end of the welding torch 3. The power cable 41 and the wire electrode are electrically connected at a contact tip arranged at the leading end of the welding torch 3. The other output terminal b for welding power from the welding power supply device 1 is connected to a workpiece W via the power cable 42. The welding power supply device 1 generates an arc between the workpiece W and the leading end of the wire electrode protruding from the leading end of the welding torch 3, and supplies power to the arc. The welding system A1 performs welding on the workpiece W using the heat of the arc.

The power for driving a wire feeding motor 24 and the like for feeding the wire electrode is supplied from the welding power supply device 1 to the wire feeding device 2 via the power transfer lines 51 and 52. The power transfer lines 51 and 52 are two parallel lines, and a heavy-duty cable with a thick coating (e.g., a double-core cabtire cable) is used therefor. Note that it is possible to use a shielded cable in order to increase noise resistance. Also, a coaxial cable or the like may be used for the power transfer lines 51 and 52. In actuality, the welding system A1 includes a wire reel around which the wire electrode is wound, a gas cylinder for a shielding gas to be emitted from the welding torch 3, and the like.

The welding power supply device 1 supplies DC power for arc welding to the welding torch 3. The welding power supply device 1 includes a welding power supply unit 11, a feeding device power supply unit 12, a control unit 13, and a communication unit 14.

The welding power supply unit 11 converts three-phase AC power input from a power system into DC power appropriate for arc welding and outputs it. As shown in FIG. 2, the three-phase AC power input to the welding power supply unit 11 is converted into DC power by a rectifier circuit 111, and is converted into AC power by an inverter circuit 112. Also, it is stepped down (or stepped up) by a transformer 113, converted into DC power by a rectifier circuit 114, and output. Note that the configuration of the welding power supply unit 11 is not limited to that described above.

The feeding device power supply unit 12 outputs power for driving the feeding motor 24 of the wire feeding device 2 and the like. The feeding device power supply unit 12 converts single-phase AC power input from a power system into DC power suitable for use in the wire feeding device 2, and outputs it. The feeding device power supply unit 12 is a so-called switching regulator, and as shown in FIG. 2, the AC power input to the feeding device power supply unit 12 is converted into DC power by a rectifier circuit 121, stepped down (or stepped up) by a DC/DC converter circuit 122, and output. The feeding device power supply unit 12 supplies DC power whose voltage is controlled so as to be 48 V, for example, to the wire feeding device 2 via the power transfer lines 51 and 52. Note that the configuration of the feeding device power supply unit 12 is not limited to that described above. For example, a configuration similar to that of the welding power supply unit 11 may be used, or a configuration may be used in which AC power input from the power system is stepped down (or stepped up) by a transformer, is subsequently converted into DC power by the rectifier circuit 121, and output.

The control unit 13 performs control of the welding power supply device 1 and is realized by a microcomputer or the like, for example. The control unit 13 controls the inverter circuit 112 of the welding power supply unit 11 such that the welding voltage and welding current output from the welding power supply device 1 are a set voltage and a set current. Also, the control unit 13 controls the DC/DC converter circuit 122 of the feeding device power supply unit 12 such that the voltage output from the feeding device power supply unit 12 is a predetermined voltage. The control unit 13 performs control such as changing welding conditions according to an operation of a setting button (not shown), and starting up the welding power supply unit 11 in response to an operation of a startup button (not shown). Also, the control unit 13 displays the detection value of the welding voltage or the welding current detected by a sensor (not shown) on a display unit (not shown), and causes a notification unit (not shown) to perform notification if an abnormality occurs.

Also, the control unit 13 changes the welding condition or starts up the welding power supply unit 11 based also on signals output from the communication unit 14, and outputs signals indicating the detection value for the detected welding voltage or welding current, or the occurrence of an abnormality, as well as signals for a wire feeding command, a gas feeding command, or the like for the wire feeding device 2 to the communication unit 14.

The communication unit 14 is for performing communication with the wire feeding device 2 via the power transfer lines 51 and 52. The communication unit 14 demodulates signals received from the wire feeding device 2 and outputs them to the control unit 13. Examples of signals received from the wire feeding device 2 include signals for setting a welding condition, startup signals for instructing startup of the welding power supply unit 11, and the like. Also, the communication unit 14 modulates signals input from the control unit 13 and transmits them to the wire feeding device 2 as communication signals. Examples of communication signals transmitted to the wire feeding device 2 include signals indicating the detection value of the detected welding voltage or welding current, signals indicating the occurrence of an abnormality, signals for wire feeding commands and gas supply commands, and the like. Note that communication signals transmitted to and received from the wire feeding device 2 are not limited to those described above.

The communication unit 14 performs communication using a direct sequence spread spectrum (DSSS) communication method. With the DSSS communication method, the transmitting side performs a calculation using a spread code on the signal to be transmitted, spreads the spectrum of the original signal over a wider band, and transmits the resulting signal. The receiving side reverts the received signal back to the original signal by performing de-spreading using the same spread code. Even if noise is superimposed on the communication signal, the spectrum of the noise is spread using de-spreading, and therefore the original communication signal can be extracted by filtering. Also, if a different spread code is used for each welding system A1, even if a communication signal transmitted and received using another welding system A1 is received erroneously, the communication signal is subjected to de-spreading using a different spread code, and thus is removed as noise. Accordingly, communication can be performed with high communication quality.

The communication unit 14 includes a coupled circuit. The coupled circuit includes a high-frequency transformer formed by magnetically coupling a coil connected to the input and output terminals of the communication unit 14 and a coil connected in parallel with the power transfer lines 51 and 52, superimposes communication signals output by the communication unit 14 on the power transfer lines 51 and 52, and detects communication signals superimposed on the power transfer lines 51 and 52. The communication unit 14 performs binary phase key shifting (BPSK) modulation on a carrier signal according to a signal input by the control unit 13, performs spectrum spreading on the modulated signal, converts it into an analog signal, and transmits it. Note that the modulation method is not limited to BPSK modulation, and ASK modulation or FSK modulation may be used. Also, the spectrum spreading is not limited to a direct spreading method and a frequency hopping method may be used. Note that in the present embodiment, spectrum spreading is performed, but there is no limitation to this, and a configuration is possible in which spectrum spreading is not used. Also, the communication unit 14 detects the communication signal superimposed on the power transfer lines 51 and 52, converts the communication signal into a digital signal, performs de-spreading and filtering thereon, performs demodulation thereon, and outputs it to the control unit 13. Signals transmitted from the welding power supply device 1 to the wire feeding device 2 and signals transmitted from the wire feeding device 2 to the welding power supply device 1 are transmitted and received at different times. Note that a configuration is possible in which different frequency bands are used.

The wire feeding device 2 feeds a wire electrode to the welding torch 3. Also, the wire feeding device 2 supplies a shielding gas from the gas cylinder to the leading end of the welding torch 3. The wire feeding device 2 includes a power supply unit 21, a control unit 22, a communication unit 23, a wire feeding motor 24, and a gas electromagnetic valve 25.

The power supply unit 21 supplies power to the control unit 22, the feeding motor 24, and the gas electromagnetic valve 25. The power supply unit 21 receives a supply of power from the welding power supply device 1 via the power transfer lines 51 and 52, converts the power into a voltage appropriate for the control unit 22, the feeding motor 24, and the gas electromagnetic valve 25, and outputs the voltage. The power supply unit 21 includes a capacitor that accumulates power supplied from the welding power supply device 1, a diode for preventing the current from flowing from the capacitor to the power transfer lines 51 and 52, and a DC/DC converter for adjusting the voltage output to the control unit 22, the feeding motor 24, and the gas electromagnetic valve 25. Note that the configuration of the power supply unit 21 is not limited to that described above.

The control unit 22 performs control of the wire feeding device 2 and is realized by a microcomputer or the like, for example. The control unit 22 outputs a startup signal for starting up the welding power supply unit 11 of the welding power supply device 1 to the communication unit 23 in response to an operation signal for startup input using a torch switch (not shown) provided on the welding torch 3. Also, a welding condition stored in the storage unit (not shown) is changed in response to an operation signal for changing the welding condition input using the operation unit (not shown). In each pre-set transmission cycle (or when a welding condition is changed), the control unit 22 reads out the welding condition stored in the storage unit and outputs it to the communication unit 23. Also, the control unit 22 displays a detection value for the welding voltage or welding current input using the communication unit 23 by outputting it to the display unit (not shown), and causes a notification unit (not shown) to perform notification of abnormalities (e.g., warning by means of a warning sound through a speaker or by means of vibration) based on a signal indicating the occurrence of an abnormality input using the communication unit 23. Also, while the wire feeding command is being input from the communication unit 23, the control unit 22 feeds the wire electrode to the welding torch 3 by causing the feeding motor 24 to perform feeding of the wire electrode. Also, while the gas supply command is being input from the communication unit 23, the gas electromagnetic valve 25 is opened so that the shielding gas of the gas cylinder is emitted from the leading end of the welding torch 3.

The communication unit 23 is for performing communication with the welding power supply device 2 via the power transfer lines 51 and 52. The communication unit 23 demodulates the communication signal received from the welding power supply device 1 and outputs it to the control unit 22. Examples of communication signals received from the welding power supply device 1 include signals indicating the detection value of the welding voltage or welding current detected by the sensor in the welding power supply device 1, or the occurrence of an abnormality, a signal for a wire feeding command, gas supply command, and the like. Also, the communication unit 23 modulates signals input from the control unit 22 and transmits them to the welding power supply device as communication signals. Examples of communication signals transmitted from the welding power supply device 1 include signals for setting a welding condition, startup signals for instructing startup of the welding power supply unit 11, and the like. Note that the communication signals transmitted from and received by the welding power supply device 1 are not limited to those described above. Similarly to the communication unit 14, the communication unit 23 performs communication using a DSSS communication method.

The communication unit 23 includes a coupled circuit. The coupled circuit includes a transformer formed by magnetically coupling a coil connected to the input and output terminals of the communication unit 23 and a coil connected in parallel with the power transfer lines 51 and 52, superimposes communication signals output by the communication unit 23 on the power transfer lines 51 and 52, and detects communication signals superimposed on the power transfer lines 51 and 52.

The feeding motor 24 performs feeding of the wire electrode to the welding torch 3. The feeding motor 24 rotates based on a wire feeding command from the control unit 22 so as to rotate a feeding roller and feed the wire electrode to the welding torch 3.

The gas electromagnetic valve 25 is provided in a gas pipe that connects the gas cylinder and the welding torch 3 and opens and shuts based on the gas supply command from the control unit 22. While the gas supply command is being input from the control unit 22, the gas electromagnetic valve 25 is opened so that supply of the shielding gas to the welding torch 3 is performed. On the other hand, when the gas supply command is not being input from the control unit 22, the gas electromagnetic valve 25 is shut so that supply of the shielding gas to the welding torch 3 is stopped.

According to the present embodiment, the welding power supply device 1 and the wire feeding device 2 perform communication via the power transfer lines 51 and 52. The power transfer lines 51 and 52 have less superimposed noise compared to the power cables 41 and 42. Accordingly, communication can be performed more accurately than in the case of performing communication via the power cables 41 and 42. Also, in the case of using the power cables 41 and 42, the impedance changes dramatically according to the length and how they are wound (extended state or wound state), but since the power transfer lines 51 and 52 are two parallel lines, there is little change in the impedance. Accordingly, attenuation of the signal can be suppressed in comparison to the case of performing communication via the power cables 41 and 42.

Also, according to the present embodiment, the power for welding and the power for driving the feeding motor 24 and the like are supplied by separate routes. Accordingly, control of the power for welding is less likely to be influenced than in the case of using part of the power for welding supplied by the power cables 41 and 42 as power for driving the feeding motor 24 and the like.

Also, the power transfer lines 51 and 52 are more heavy-duty due to having a thicker coating, and therefore, in comparison with the case of using the multicore cable of the control line, there is less risk of line-cutting and even if the line is cut, repair is easier. Also, the power transfer lines 51 and 52 are more easily obtained and less expensive than a multicore cable, and connectors for connection are also less expensive.

Note that although the present embodiment has described a case in which the communication units 14 and 23 superimpose communication signals on the power transfer lines 51 and 52 using magnetic coupling by means of coils and the communication signals superimposed on the power transfer lines 51 and 52 are detected, there is no limitation thereto. For example, electric field coupling by means of a capacitor may be used. Also, instead of inputting the communication signals in parallel to the power transfer lines 51 and 52, the communication signals may be input in series to the power transfer line 51 or 52.

Although the present embodiment has described a case in which the feeding device power supply unit 12 supplies DC power to the power supply unit 21, it is also possible to supply AC power. In such a case, it is sufficient that the feeding device power supply unit 12 includes a transformer instead of the rectifier circuit 121 and the DC/DC converter circuit 122, and the AC power input from the power system is stepped down and output. On the other hand, the power supply unit 21 needs to be provided with a rectifier circuit for converting AC power into DC power. Also, it is possible to supply AC power from the power system directly to the power supply unit 21 via the power transfer lines 51 and 52 and not provide the feeding device power supply unit 12 in the welding power supply device 1.

Figure 3:
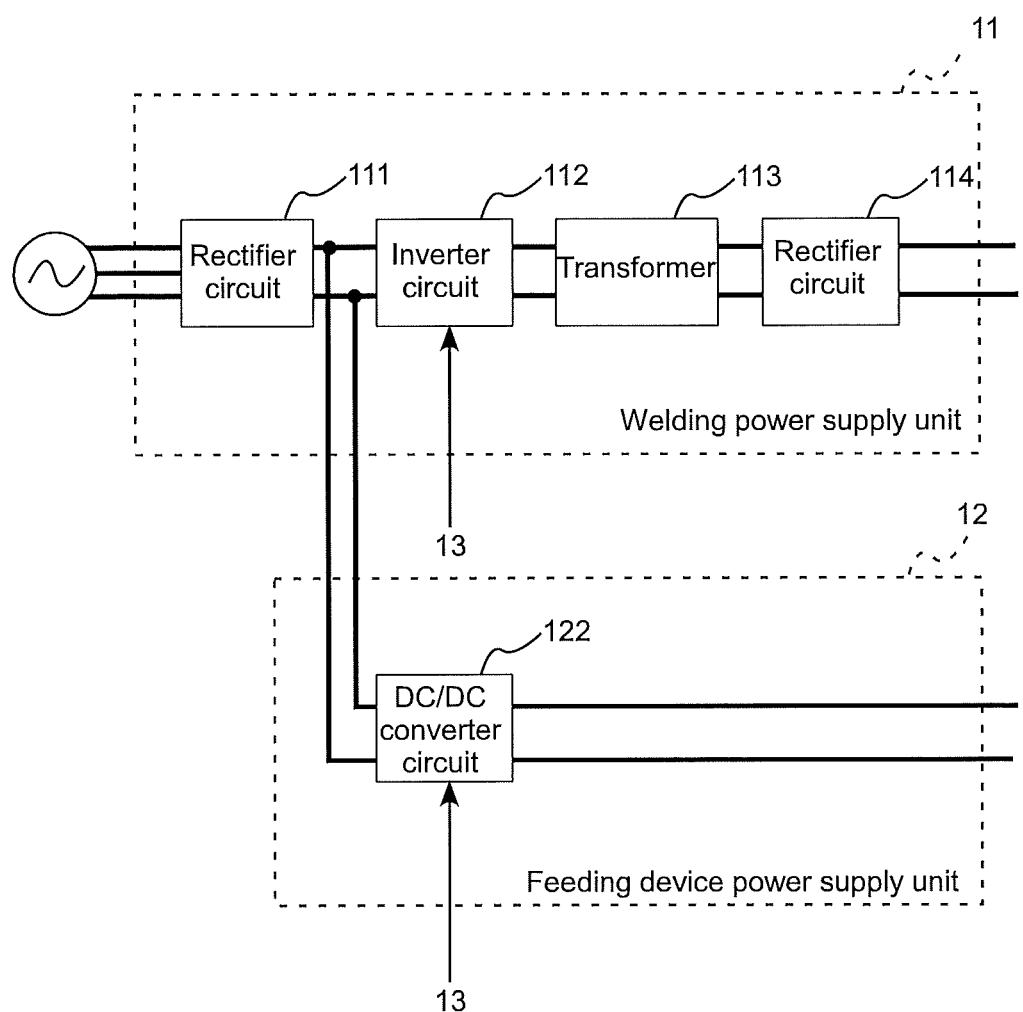
FIG. 3 shows another embodiment of a welding power supply unit and a feeding device power supply unit.

Although the present embodiment has described a case in which the welding power supply unit 11 and the feeding device power supply unit 12 each convert the AC power from the power system into DC power and output it, there is no limitation to this. A portion of the configuration of the welding power supply unit 11 and the feeding device power supply unit 12 may be shared therebetween. For example, as shown in FIG. 3, a configuration may be used in which the rectifier circuit 121 is not provided in the feeding device power supply unit 12 and the output from the rectifier circuit 111 of the welding power supply unit 11 is input to the DC/DC converter circuit 122. Also, a configuration may be used in which a winding is added to a second side of the transformer 113 of the welding power supply unit 11 so as to draw out power, which is rectified and output, or a configuration may be used in which the feeding device power supply unit 12 is not provided and part of the output from the welding power supply unit 11 is supplied to the wire feeding device 2 via the power transfer lines 51 and 52.

Although the present embodiment has described a case in which the welding power supply device 1 is a DC power supply that supplies DC power to an arc, there is no limitation to this. For example, the welding power supply device 1 may be an AC power supply that supplies AC power in order to perform welding of aluminum or the like. In such a case, it is sufficient that an inverter circuit is furthermore added to the welding power supply unit 11 so as to convert DC power output from the rectifier circuit 114 into AC power and output it.

The present embodiment has described a case in which the welding system A1 is a consumable-electrode welding system. In the case of a consumable-electrode welding system, there are cases where a wire feeding device for automatically feeding a filler wire is used, but a wire feeding device for feeding the wire electrode is not necessary. In such a case, the wire feeding device has a configuration similar to that used in the welding system A1, and the present invention can be applied thereto.

The welding system A1 includes a gas pipe for supplying a shielding gas from the gas cylinder to the welding torch 3, although this is not shown in FIG. 1. The power transfer lines 51 and 52 may be at least partially arranged inside of the gas pipe, or may be bundled with the gas pipe. A case in which the power transfer lines 51 and 52 are arranged inside of the gas pipe will be described below as a second embodiment.

Figure 4A:
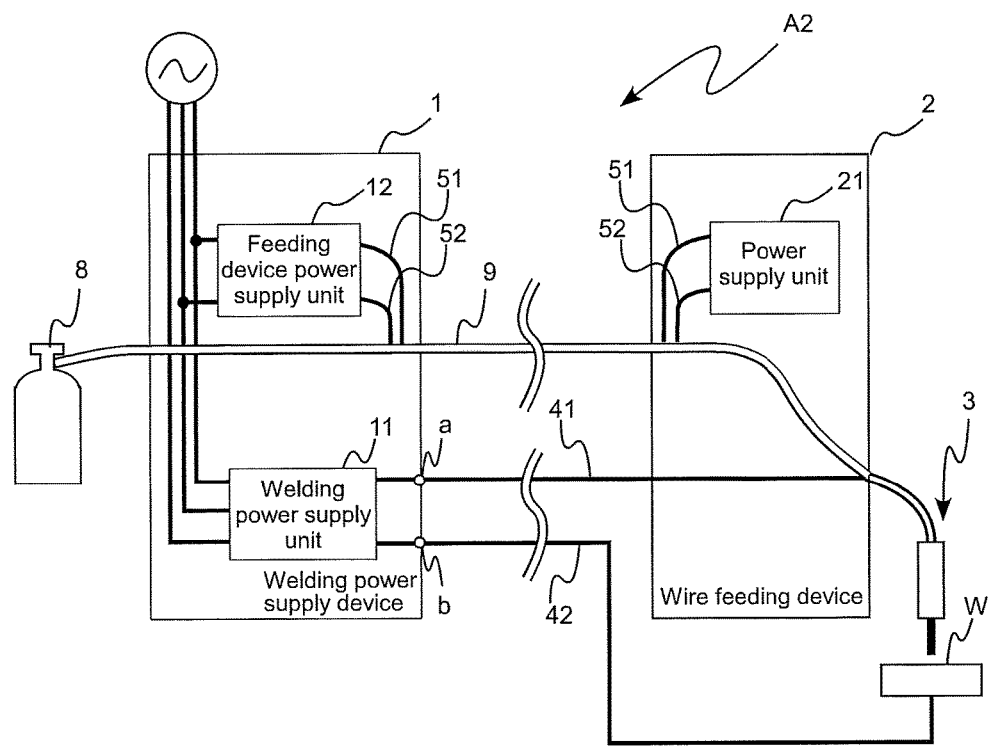
FIGS. 4A and 4B are diagrams for illustrating a welding system according to a second embodiment.
Figure 4B:
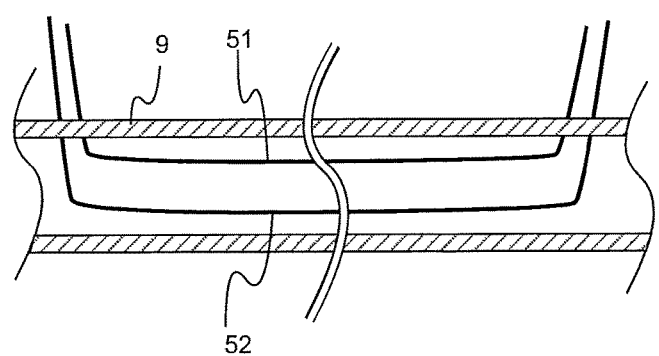

FIGS. 4A and 4B are diagrams for illustrating a welding system A2 according to the second embodiment. FIG. 4A shows the overall configuration of the welding system according to the second embodiment. In FIG. 4A, components that are the same or similar to those of the welding system A1 (see FIG. 1) according to the first embodiment are denoted by the same reference numerals. Note that in FIG. 4A, the illustration regarding part of the internal configurations of the welding power supply device 1 and the wire feeding device 2 has been omitted. FIG. 4B shows a cross-sectional view of a gas pipe 9.

The welding system A2 shown in FIGS. 4A and 4B differs from the welding system A1 according to the first embodiment in that a part of each of the power transfer lines 51 and 52 is arranged inside of the gas pipe 9.

The gas pipe 9 connects the gas cylinder 8 and the welding torch 3 via the welding power supply device 1 and the wire feeding device 2, and supplies the shielding gas from the gas cylinder 8 to the leading end of the welding torch 3. The power transfer lines 51 and 52 are arranged inside of the gas pipe 9 between the welding power supply device 1 and the wire feeding device 2. The power transfer lines 51 and 52 are brought into the interior of the gas pipe 9 through through-holes provided in the gas pipe 9. In order to prevent gas leakage and entry of water, the through-holes through which the power transfer lines 51 and 52 have been passed need to be hermetically sealed.

According to the second embodiment, the power transfer lines 51 and 52 are arranged inside of the gas pipe 9 connecting the welding power supply device 1 and the wire feeding device 2, and therefore interfere less when the wire feeding device 2 is moved, in comparison to the case where the power transfer lines 51 and 52 are arranged separate from the gas pipe 9. Also, the power transfer lines 51 and 52 are surrounded by gas pipe 9, and therefore there is less influence from the outside and it is possible to suppress a case in which the power transfer lines 51 and 52 are cut.

Figure 5A:
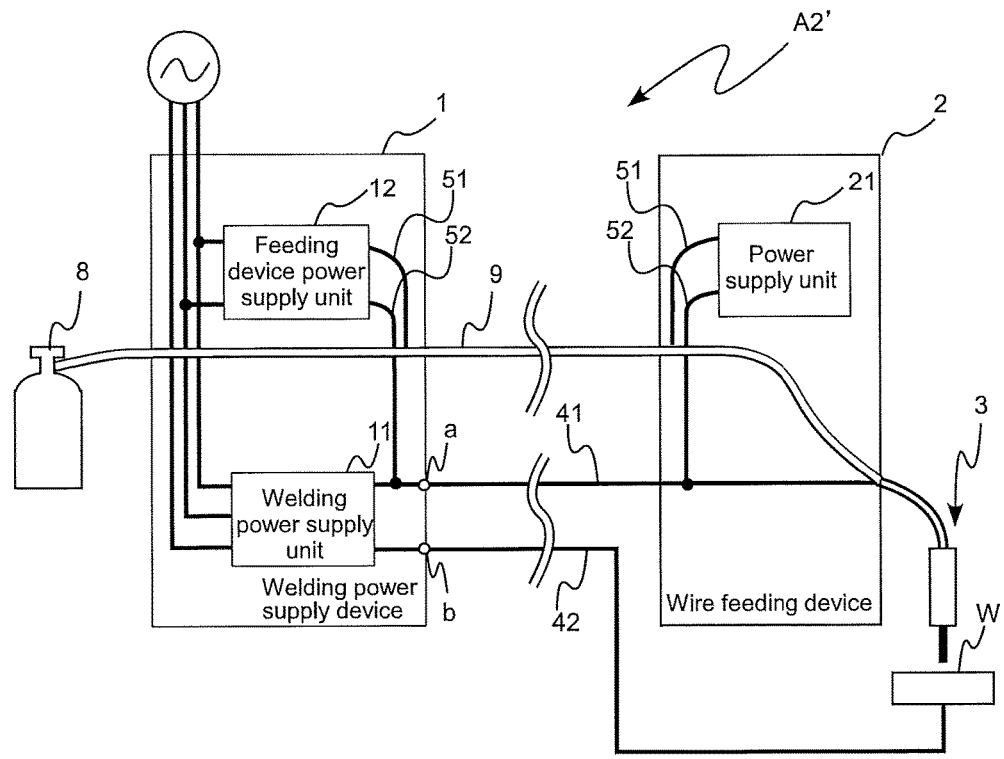
FIGS. 5A and 5B are diagrams for illustrating another embodiment of the welding system according to the second embodiment.
Figure 5B:
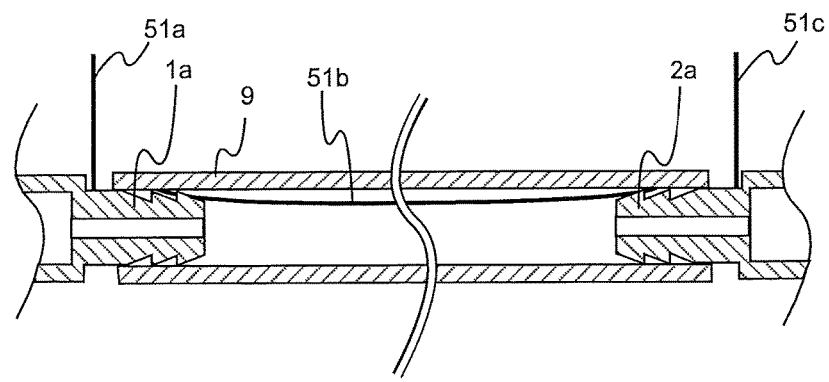

Note that as with the welding system A2 shown in FIGS. 5A and 5B, it is possible to cause the power cable 41 to act as the power transfer line 52 as well by connecting the power transfer line 52 to the power cable 41. In this case, it is sufficient that only (a part of) the power transfer line 51 is arranged inside of the gas pipe 9. If only one power transfer line is arranged in the gas pipe 9, as shown in FIG. 5B, it is possible to simplify the arrangement of the power transfer line 51 by using a connection fitting 1a for the gas pipe provided in the welding power supply device 1 (connection fitting 2a for the gas pipe provided in the wire feeding device 2) as a connector. In the illustrated example, more specifically, the power transfer line 51 is made up of first, second and third lines (sub-lines) 51a, 51b and 51c, as shown in FIG. 5B. The first line 51a is electrically connected, at one end thereof, to the connection fitting 1a. The second line 51b as a whole is disposed within the gas pipe 9, with its both ends being connected to the inner surface of the gas pipe 9. The third line 51c is electrically connected, at one end thereof, to the connection fitting 2a. When the two connection fittings 1a, 2a are sufficiently fitted into the respective ends of the gas pipe 9, the connection fitting 1a comes into contact with one end of the second line 51b, and the other connection fitting 2a comes into contact with the other end of the second line 51b. In this manner, the first line 51a and the second line 51b are electrically connected to each other via the connection fitting 1a, while the second line 51b and the third line 51c are electrically connected to each other via the connection fitting 2a.

Next, a case of providing a remote operation device for operating the wire feeding device 2 will be described below as a third embodiment.

Figure 6:
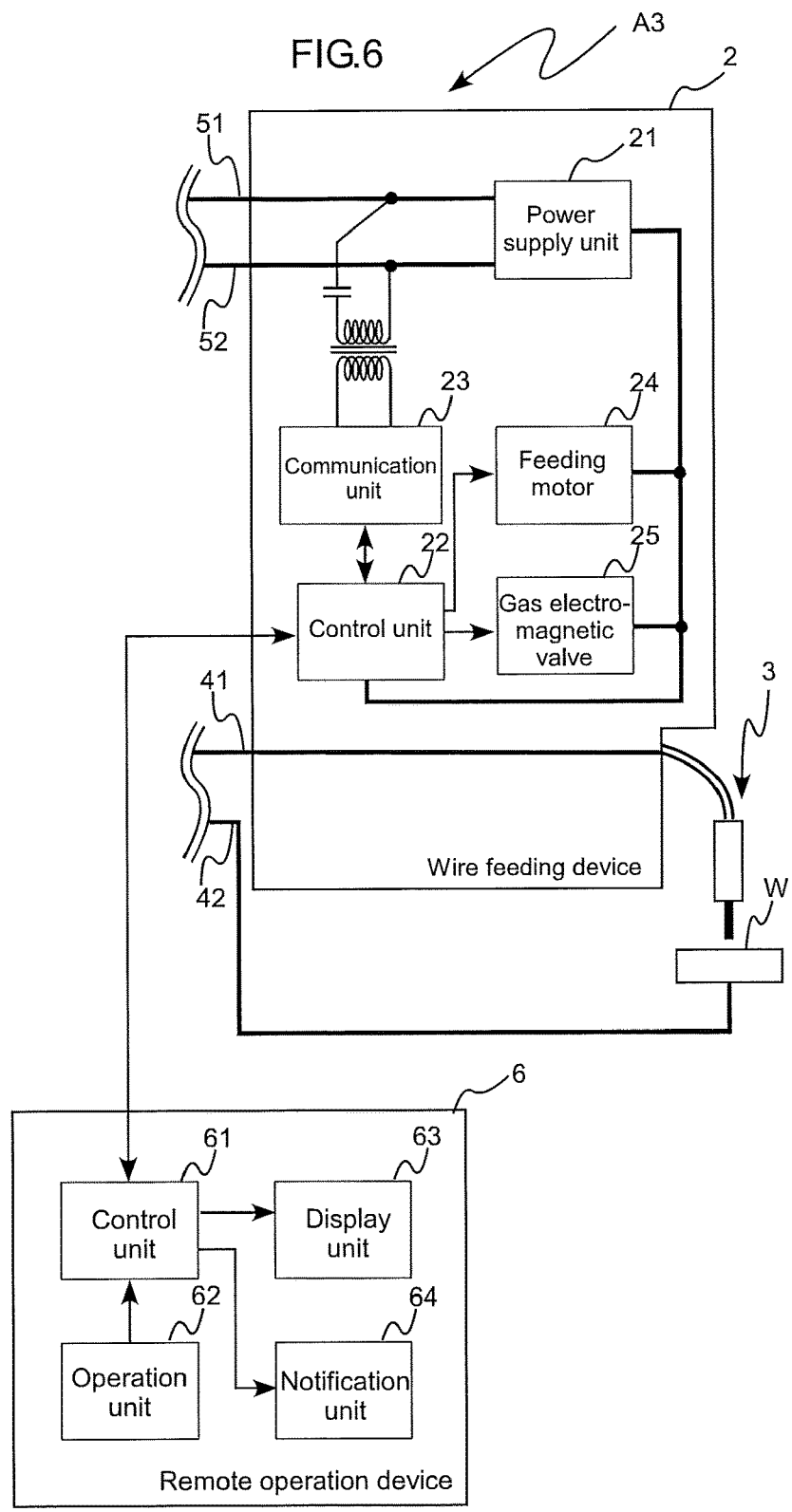
FIG. 6 is a diagram for illustrating an overall configuration of a welding system according to a third embodiment.

FIG. 6 is diagram for illustrating the overall configuration of a welding system A3 according to the third embodiment. In FIG. 6, components that are the same or similar to those of the welding system A1 (see FIG. 1) according to the first embodiment are denoted by the same reference numerals. Note that in FIG. 6, the illustration regarding the welding power supply device 1 has been omitted.

The welding system A3 shown in FIG. 6 differs from the welding system A1 according to the first embodiment in that it includes a remote operation device 6 for operating the wire feeding device 2.

The remote operation device 6 is for operating the wire feeding device 2, and is connected by a cable to the wire feeding device 2. Also, the remote operation device 6 can perform operation of the welding power supply device 1 as well by causing a communication signal to be transmitted from the wire feeding device 2 to the welding power supply device 1. The remote operation device 6 includes a control unit 61, an operation unit 62, a display unit 63, and a notification unit 64. The operation unit 62, display unit 63, and notification unit 64 respectively include functions similar to those of the operation unit, display unit, and notification unit provided in the wire feeding device 2.

The control unit 61 controls the remote operation device 6. The control unit 61 converts the operation signal input using the operation unit 62 into a digital signal and outputs it to the control unit 22 of the wire feeding device 2. Also, based on the digital signal input by the control unit 22, display is performed by the display unit 63, and notification of an abnormality is performed by the notification unit 64.

According to the third embodiment, a worker can change a welding condition and the like by operating the operation unit 62 of the remote operation device 6, and can check the detection value of the welding voltage or welding current using the display unit 63. Accordingly, if the remote operation device 6 is kept on the person of the worker, there is no need to move to the wire feeding device 2.

Note that although the third embodiment has described a case in which the remote operation device 6 and the wire feeding device 2 transmit and receive signals, there is no limitation to this. The input to the operation unit 62 may be analog input, and the remote operation device 6 and the wire feeding device 2 may be connected using a control line. Note that in such a case, the wire feeding device 2 needs to be provided with an A/D conversion circuit that converts the analog signal received from the remote operation device 6 into a digital signal, and as a result, the size and weight of the wire feeding device 2 increase, reducing portability. Also, if there are more welding parameters, the control lines connecting the remote operation device 6 and the wire feeding device 2 increase in number. Accordingly, it is more desirable to perform communication using a digital signal.

Next, a case in which the welding voltage is detected near the arc will be described hereinafter as a fourth embodiment.

Figure 7:
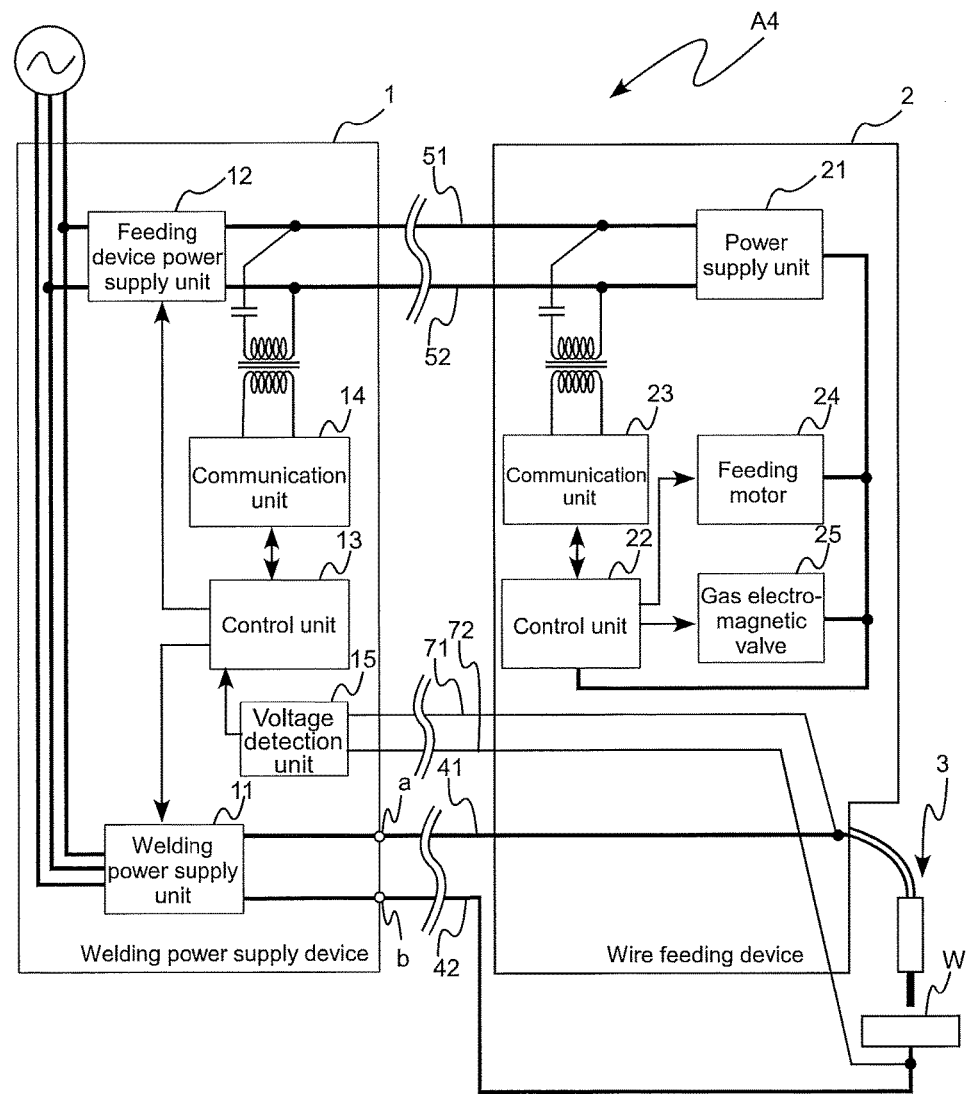
FIG. 7 is a diagram for illustrating an overall configuration of a welding system according to a fourth embodiment.

FIG. 7 is diagram for illustrating the overall configuration of a welding system A4 according to the fourth embodiment. In FIG. 7, components that are the same or similar to those of the welding system A1 (see FIG. 1) according to the first embodiment are denoted by the same reference numerals.

The welding system A4 shown in FIG. 7 differs from the welding system A1 according to the first embodiment in that the welding power supply device 1 includes a welding voltage detection unit 15 that detects the welding voltage near the arc.

The welding voltage is usually detected inside of the welding power supply device 1 between the output terminal a and the output terminal b or the like, for example. However, an error is present in the voltage that is actually applied to the arc, and in order to improve the detection accuracy, it is desirable to perform detection near the arc. For example, if a voltage is detected between a contact tip arranged on the leading end of the welding torch 3 and the workpiece W, a voltage near the voltage applied to the arc can be detected. However, in the case of providing a voltage detection unit inside of the wire feeding device 2 and transmitting the detected voltage value to the welding power supply device 1 via the power transfer lines 51 and 52, there is a time delay from when the voltage is detected to when the voltage value is input to the control unit 13 of the welding power supply device 1. In the case of performing precision welding, or the like, control is delayed due to this time delay, which causes the end result of welding to be poor in some cases. In the third embodiment, the delay caused by transmission of the voltage value is eliminated by detecting the welding voltage near the arc inside of the welding power supply device 1 and inputting the detected voltage value to the control unit 13.

One end of a voltage signal line 71 is connected to the contact tip, and the other end is connected to the welding voltage detection unit 15. One end of a voltage signal line 72 is connected to the workpiece W, and the other end is connected to the welding voltage detection unit 15. A heavy-duty cable with two parallel lines and a thick coating is used for the voltage signal lines 71 and 72. Note that a coaxial cable or the like may be used for the voltage signal lines 71 and 72. Also, the voltage signal lines 71 and 72 and the power transfer lines 51 and 52 may be grouped together into one cable.

The welding voltage detection unit 15 detects the welding voltage near the arc. The welding voltage detection unit 15 detects the welding voltage based on the voltage signal received using the voltage signal lines 71 and 72. The welding voltage detection unit 15 outputs the detected voltage value to the control unit 13.

According to the fourth embodiment, the welding voltage detection unit 15 provided in the welding power supply device 1 detects the welding voltage near the arc, and therefore the amount of time it takes from when the voltage is detected to when it is input to the control unit 13 is reduced. This makes it possible to accurately perform precision welding since a highly-accurate welding voltage can be used in control with less delay.

The first to fourth embodiments have described cases in which the welding power supply device 1 performs communication with the wire feeding device 2, but there is no limitation to this. It is possible to apply the present invention also to a case in which the welding power supply device 1 performs communication with another peripheral device. A case in which the welding power supply device 1 performs communication with an interface device will be described below as a fifth embodiment.

Figure 8:
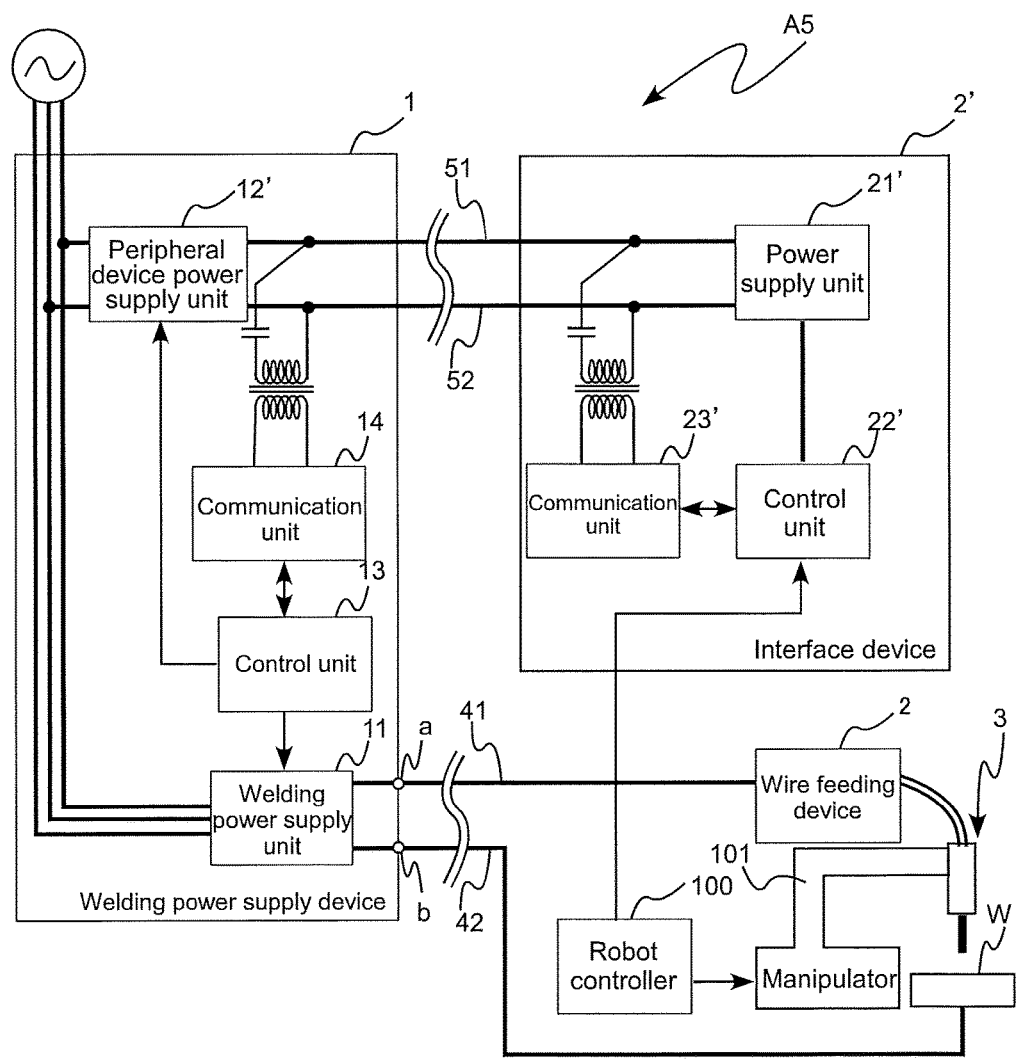
FIG. 8 is a diagram for illustrating an overall configuration of a welding system according to a fifth embodiment.

FIG. 8 is a diagram for illustrating the overall configuration of a welding system A5 according to the fifth embodiment. In FIG. 8, components that are the same or similar to those of the welding system A1 (see FIG. 1) according to the first embodiment are denoted by the same reference numerals. Note that in FIG. 8, the illustration regarding the internal configuration of the wire feeding device 2 has been omitted.

The welding system A5 shown in FIG. 8 differs from the welding system A1 according to the first embodiment in that the welding torch 3 is moved by a manipulator 101. The welding torch 3 is attached to the leading end of the manipulator 101, which moves the welding torch 3 according to a command from a robot controller 100. That is to say, the welding system A5 is not a semi-automatic welding system in which a worker moves the welding torch and performs welding, but is instead a fully-automatic welding system using a robot.

The robot controller 100 controls the welding system A5 and outputs various types of command signals to the manipulator 101 and the welding power supply device 1. The robot controller 100 outputs an operation command signal to the manipulator 101 so as to control motors for each axis (not shown) of the manipulator 101, and thereby causes the welding torch 3 to move. Also, the robot controller 100 controls the welding power supply device 1 by outputting a startup signal or a setting signal for the welding current or the like to the welding power supply device 1 via an interface device 2'.

The interface device 2' mediates various types of command signals output by the robot controller 100 and conveys them to the welding power supply device 1. The robot controller 100 and the interface device 2' are connected by a multicore cable that includes the same number of control lines as types of command signals. The robot controller 100 outputs various types of command signals as analog signals to the interface device 2'. The interface device 2' converts analog signals input by the robot controller 100 into digital signals and outputs them to the welding power supply device 1.

The interface device 2' includes a power supply unit 21', a control unit 22', and a communication unit 23'. The power supply unit 21' is similar to the power supply unit 21 according to the first embodiment, receives a supply of power from a peripheral device power supply unit 12' of the welding power supply device 1 (similar to the feeding device power supply unit 12 according to the first embodiment) via the power transfer lines 51 and 52, converts the power into a voltage that is appropriate for the control unit 22' and an analog circuit (not shown), and outputs them. The control unit 22' controls the interface device 2' and is realized by a microcomputer or the like, for example. The control unit 22' converts the analog signal input by the robot controller 100 into a digital signal and outputs it to the communication unit 23'. The communication unit 23' is similar to the communication unit 23 according to the first embodiment, and performs communication with the welding power supply device 1 via the power transfer lines 51 and 52. The communication unit 23' demodulates the signals input from the control unit 22' and transmits them as communication signals to the welding power supply device 1.

In the fifth embodiment as well, it is possible to achieve effects similar to those of the first embodiment.

The welding system and welding system communication method according to the present invention are not limited to the above-described embodiments. Specific configurations of portions of the welding system and welding system communication method according to the present invention may be designed and modified in various ways.

The invention claimed is:

1. A welding system comprising:
   a welding power supply device;
   a peripheral device;
   a welding torch;
   a power cable for supplying welding power from the welding power supply device to the welding torch; and
   a power transfer line for supplying power for driving the peripheral device from the welding power supply device to the peripheral device;
   wherein the welding power supply device and the peripheral device are configured to perform communication via the power transfer line,
   the welding power supply device comprises a welding power supply unit and a peripheral device power supply unit separate from the welding power supply unit,
   the power cable is connected to the welding power supply unit and to the welding torch;
   the peripheral device includes: a control unit that controls the peripheral device; and a power supply unit that supplies electric power to the control unit, and the power transfer line is connected to the peripheral device power supply unit of the welding power supply device and to the power supply unit of the peripheral device.

2. The welding system according to claim 1, wherein the peripheral device is a wire feeding device.

3. The welding system according to claim 2, further comprising a gas pipe for supplying a shielding gas to the welding torch,
wherein at least a part of the power transfer line is arranged inside of the gas pipe.

4. The welding system according to claim 3, wherein the gas pipe extends via the welding power supply device and the wire feeding device.

5. The welding system according to claim 1, wherein the power supplied by the welding power supply device to the peripheral device is DC power.

6. The welding system according to claim 1, wherein the power transfer line is a cable with two parallel lines.

7. A communication method for a welding system including a welding power supply device, a peripheral device, a welding torch, a power cable for supplying welding power from the welding power supply device to the welding torch, and a power transfer line for supplying power for driving the peripheral device from the welding power supply device to the peripheral device, the communication method comprising:
a first step in which one of the welding power supply device and the peripheral device superimposes a communication signal on the power transfer line; and
a second step in which the other of the welding power supply device and the peripheral device detects the communication signal superimposed on the power transfer line,
wherein the welding power supply device comprises a welding power supply unit and a feeding device power supply unit separate from the welding power supply unit, the power cable is connected to the welding power supply unit, and the power transfer line is connected to the feeding device power supply unit,
wherein the peripheral device is a wire feeding device,
wherein the feeding device power supply unit of the welding power supply device converts single-phase AC power into DC power, and the wire feeding device comprises a wire feeding motor and a power supply unit for converting the DC power into a voltage appropriate for the wire feeding motor, and wherein the power transfer line connects the feeding device power supply unit and the power supply unit of the wire feeding device to each other.

8. The communication method according to claim 7, wherein the power transfer line is a cable with two parallel lines.

9. The communication method according to claim 7, wherein the communication system further comprises a gas pipe for supplying a shielding gas to the welding torch, and at least a part of the power transfer line is arranged inside of the gas pipe.

10. The communication method according to claim 7, wherein each of the first step and the second step is performed using a direct sequence spread spectrum communication method.

* * * * *